United States Patent [19]

Nakada

[11] 3,865,230
[45] Feb. 11, 1975

[54] TRANSFER FEEDER
[75] Inventor: Kouiti Nakada, Ishikawa-ken, Japan
[73] Assignee: Kabushiki Kaisha Komatsu Seisakusho, Tokyo-To, Japan
[22] Filed: July 9, 1973
[21] Appl. No.: 377,293

[52] U.S. Cl. .............................................. 198/218
[51] Int. Cl. ............................................ B65g 25/04
[58] Field of Search ........................ 198/24, 218, 219

[56] References Cited
UNITED STATES PATENTS
2,324,001  7/1943  Kelly .............................. 198/218 X
3,420,357  1/1969  Eck ................................... 198/219
FOREIGN PATENTS OR APPLICATIONS
153,797  10/1953  Australia ............................ 198/218

Primary Examiner—Robert B. Reeves
Assistant Examiner—Hadd S. Lane
Attorney, Agent, or Firm—Toren, McGeady and Stanger

[57] ABSTRACT

The apparatus of the present invention is a transfer feeder arranged between one press and another press provided at a required distance from said press. An article formed into a desired shape is taken out of the press by means of the carrier of the transfer feeder; the formed article thus taken out is transferred to another press; and then the latter press can perform a desired press work. Especially, with this invention, it is possible to obtain a horizontal stroke of the carrier of the transfer feeder having an extremely large ratio between the height of the apparatus and the horizontal stroke as compared with the conventional apparatus.

2 Claims, 3 Drawing Figures

TRANSFER FEEDER

BACKGROUND OF THE INVENTION

A transfer feeder is an apparatus in which carriers are given with lifting, advancing, lowering and returning motions so as to take out a formed article worked on one of two presses at one side, and to supply or transfer it to a press die on another press at the other side. The apparatus is generally provided with lifter cams for lifting and lowering of the carrier and feeder cams for advancing and returning of the carrier, and various operations of the carriers are controlled by said cams.

In conventional transfer feeders, two kinds of above-said cams are equally mounted on a horizontal shaft arranged perpendicularly to the direction of the horizontal stroke of the carrier. With the increase in size of formed articles in the recent time, the large horizontal stroke in case of transferring formed articles by the transfer feeder necessarily is required.

The height of the carriers in a transfer feeder is determined by the height up to the surface of the press die in the press machine. Accordingly, in the case of letting the feeder cam have a large diameter in order to obtain a larger horizontal stroke of the carrier, there is a certain limitation, because the feeder cam is designed so as to rotate in the vertical plane.

In view of the above fact, the present invention has an object to provide a transfer feeder which allows a horizontal stroke having a remarkably large ratio as compared with the height of the apparatus as a transfer feeder, in which cams for a feeder are made rotatable in a horizontal plane and are secured on a vertical shaft, whereby the cams can be made larger in proportion to the increase in the stroke.

SUMMARY OF THE INVENTION:

The present invention relates to a transfer feeder for transferring formed articles between presses.

The object of the present invention is to provide a transfer feeder which has a large ratio of horizontal stroke in the transferring direction as compared with the height of the transfer feeder device, when the height of the transfer feeder and the distance of transfer made by the carrier, which is provided on the transfer feeder and which transfers the formed articles, are compared.

Another object of the present invention is to provide a transfer feeder which causes a feeder cam to rotate in the horizontal plane for moving the carrier of the transfer feeder in the transfer direction, and which renders the height of the device of the transfer feeder appropriate in accordance with the pressing operation by the adjacent press.

A further object of the present invention, when the transfer feeder is designed, is to provide a transfer feeder which increases the horizontal stroke of the carrier of the transfer feeder so that the transferring distance is increased for transferring large-sized formed articles in a press line, and which, while keeping the height of said transfer feeder appropriate in accordance with the pressing operation of the adjacent press, allows to adopt a feeder cam having a large diameter to increase only the horizontal stroke of the carrier.

A further object of the present invention is to provide a transfer feeder in which the lifting and lowering motions of the carrier of the transfer feeder is effected through a rotation of a vertically rotating cam, and the advancing and returning motions of the carrier is effected through a rotation of a horizontally rotatint cam, and particularly, the ratio between the horizontal stroke of the carrier of the transfer feeder and the height of the transfer feeder is made considerably large than the conventional devices of this kind heretofore prevailed.

Another object of the present invention is to provide a transfer feeder which has a large transferring distance of formed articles to be transferred by the transfer feeder by selecting a large-diameter cam for feeder so that the horizontal stroke of the carrier of the transfer feeder is increased without increasing the height of the device of the transfer feeder.

Figure 1:
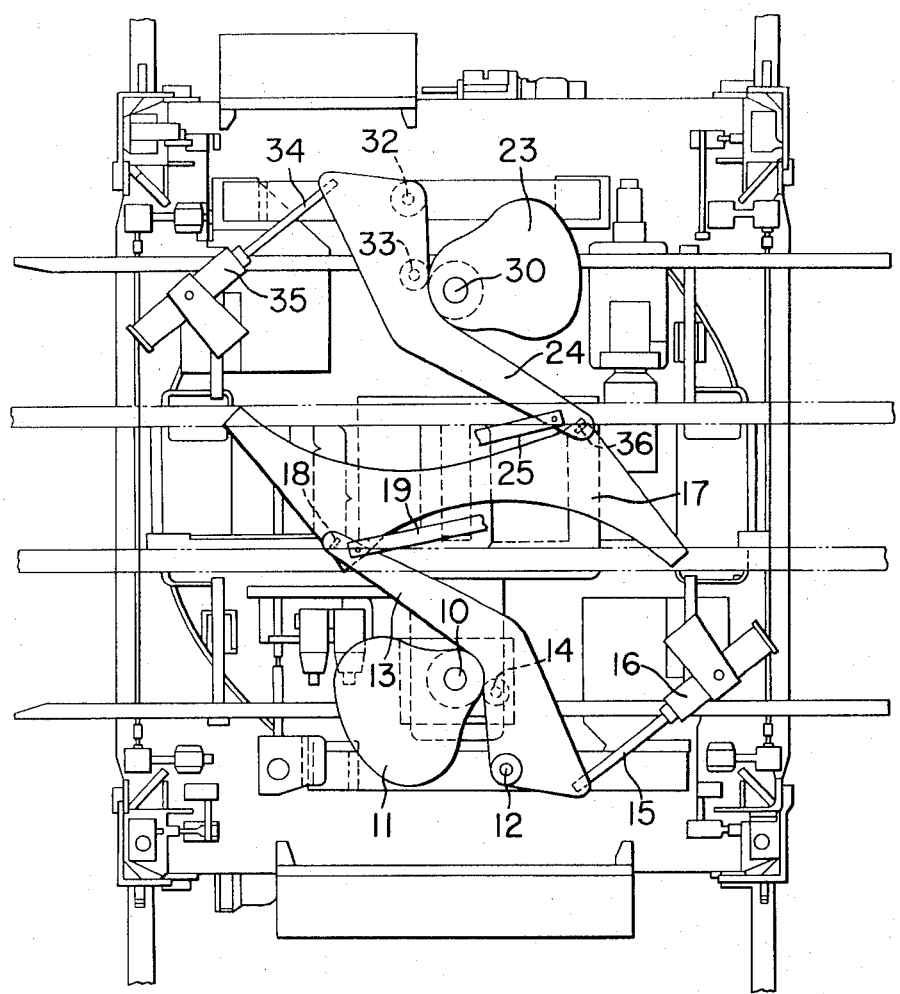
FIG. 1 is a plan view showing an arrangement of the cams and levers for feeder and guide plate which are the essential parts of the transfer feeder according to the present invention.

DETAILED DESCRIPTION OF THE INVENTION:

The present invention will now be described with respect to an embodiment thereof referring to the drawings.

Figure 2:
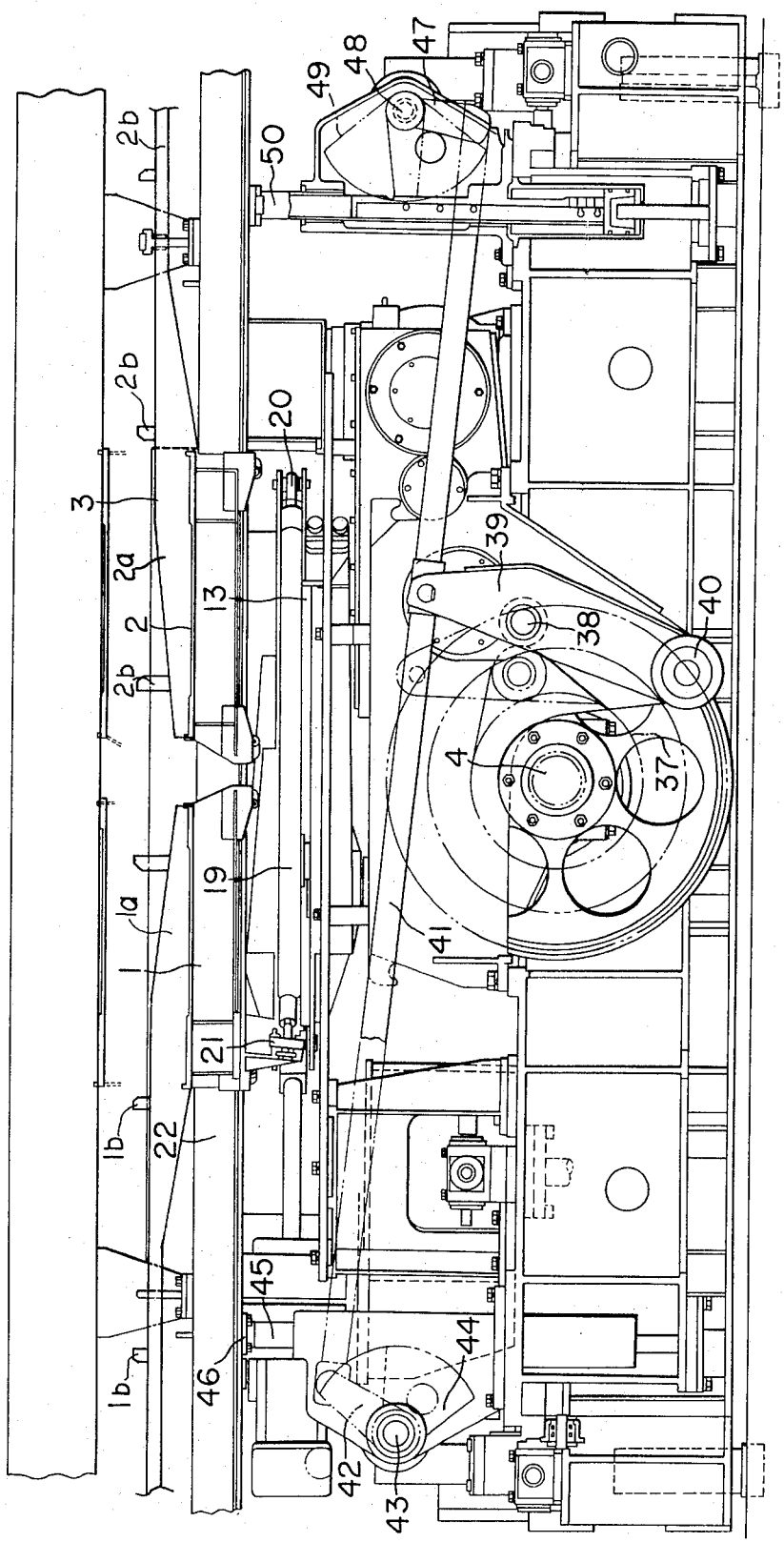
FIG. 2 is an elevation of the apparatus shown partly in section.

The transfer feeder according to the present invention is arranged between presses. Referring to FIG. 2, carriers 1, 2 are of the same form and each base portion of the two forks 1a and 2a is fixed on each carrier, said forks 1a and 2a being provided with several fingers 1b, 1b, 2b, 2b.

The operation of the transfer feeder referring to FIG. 2 can be summarized as follows:

By advancing movement in the left direction of the carrier 1, fork 1a of said carrier 1 takes up the formed article from the press room of the preceding press; said formed article is brought on placing and feeding rails 3 for placing the formed article by the lifting and returning motions of the carrier 1; said formed article placed on the rails 3 is fed toward the following press and then is taken up by the fork 2a through the lifting motion of the carrier 2 and fed to the press room of the following press by the fork 2a through the returning motion of the carrier 2; said formed article is placed on the press die of the following press by the forks 2a through the lowering motion of the carrier 2; and forks 2a of the carrier 2 are withdrawn from the press room of the following press by the advancing motion of the carrier 2. In this case, the carrier 1 serves as an unloading carrier, and the carrier 2 is a loading carrier. Both carriers carry out respectively the rectangular cyclic motion in the vertical plane between the preceding press and the following press. Said rectangular cyclic motion is carried out in the order of the advancing motion, lifting motion, returning motion and the lowering motion and also is synchronously driven so as to match the operating condition of the preceding press and that of the following press. The formed article is forwarded step by step by the fingers 1b, 2b provided on the forks 1a and 2b.

The characteristic feature of the transfer feeder according to the present invention resides in obtaining a large ratio of horizontal strokes of carriers with respect to the height of the apparatus. Said horizontal strokes of carriers mean the advancing and returning motions in the horizontal plane.

The horizontal stroke of the carrier 1 will be described referring to FIGS. 2 and 3 hereinafter.

A main shaft 4 arranged perpendicularly to the transferring direction of the formed article and extending in a horizontal direction is rotated by a driving means. On the left hand of the main shaft 4, a driving shaft 7 is continuously connected to the main shaft 4 through a coupling 6. A bevel gear 8 fixed on the driving shaft 7 is engaged with a bevel gear 9, which is mounted at the lower end of a cam-fixing shaft 10 arranged perpendicularly and vertically to an axial line of the main shaft 4. A horizontal plate feeder cam 11 is fixed at the upper end of the cam-fixing shaft 10 so as to rotate in the horizontal plane. The horizontal stroke of the carrier 1 is controlled by rotating the horizontal plate feeder cam 11.

Referring to FIG. 1, it will be seen that in the profile of the horizontal plate feeder cam 11, the ratio between the longest distance and the shortest distance from the center of the cam fixing shaft 10 to the cam edge is relatively large. There is provided a lever 13 swingable in the horizontal plane around a supporting shaft 12. a follower 14 is pivotted at the intermediate portion of the lever 13 in its lengthwise direction. The swinging end portion of the lever 13 is connected to one end of a piston rod 15, and the base portion of the piston rod 15 is fitted into a cylinder 16. The follower 14 is press-contacted to an edge of the horizontal plate feeder cam 11 by actuating the cylinder 16 through the piston rod 15 so that the lever 13 may be swung along the edge of the horizontal plate feeder cam 11 by rotating samd cam 11, and as a result, the swinging motion of the lever 13 can follow positively in accordance with the profile of the cam 11.

In the case of overlooking this apparatus, the central portion of the apparatus is provided with a guide plate 17. The other end of the lever 13 is supported by the guide plate 17, which supports the end portion of the lever 13 swingable by rotation of the cam 11 and which enables the lever 13 to always swing in the same horizontal plane. A roller 18 is pivotted at the free end of the lever 13 in order that the swing motion of the lever 13 may be smoothly carried out. The other end of the lever 13, namely the portion near the guide plate is connected to one end of a rod 19 through a universal joint 20, and the other end of the rod 19 is connected to the rod fixing portion of the carrier 1 through a universal joint 21. The carrier 1 carries out the horizontal, advancing and returning motions along rails 22, 22 by swing of the lever 13 through the rod 19.

The driving mechanism for the carrier 2 which carries out the horizontal, advancing and returning motions will be explained in the following:

Referring to FIG. 1, a horizontal plate feeder cam 23 is disposed symmetrically to the horizontal plate feeder cam 11 through the guide plate 17. Likewise, a lever 24 is disposed symmetrically to the lever 13 through the guide plate 17. The carrier 2 carries out the advancing motion or the returning motion in the horizontal plane through a rod 25 by the lever 24 which is swung by rotation of the cam 23. The guide plate 17 serves as a guide for directing horizontal movement of the free end of each of the levers 13, 24 which are to be swung by rotation of the horizontal plate feeder cams 11, 23.

Furthermore, the guide plate 17 can support loads in various directions at the point of joinder of the lever 13 and the rod 19, and at the point of joinder of the lever 24 and the rod 25, each of said rods 19 and 25 being joined to each of the free ends of the levers 13 and 24 in the inclined state. Consequently, the guide plate 17 can secure smooth horizontal movement of the unloading carrier and of the loading carrier.

Figure 3:
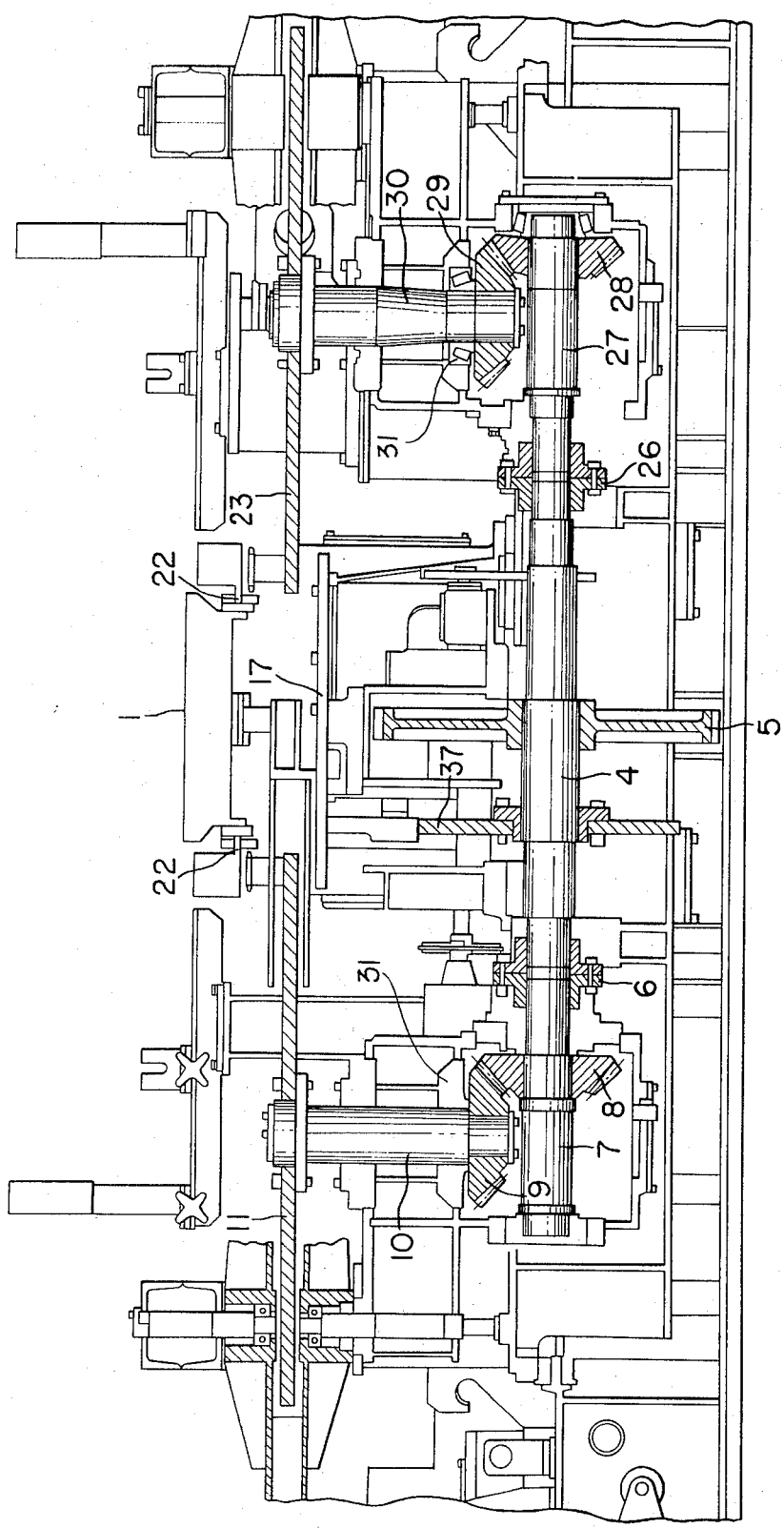
FIG. 3 is a longitudinal cross section showing the cam driving system.

Referring to FIG. 3, a driving shaft 27 is connected to the main shaft 4 through coupling 26. A bevel gear 28 fixed on the shaft 27 is engaged with a bevel gear 29 which is fixed at the lower end of a cam-fixing shaft 30 disposed with a right angle to the axial line of the main shaft 4. A horizontal plate feeder cam 23 is fixed at the upper end of the cam-fixing shaft 30 and has the same profile and dimension as those of the horizontal plate feeder cam 11. Numerals 31 indicate respectively bearing.

In FIG. 1, a follower 33 pivotted at the lever 24 which is supported by a shaft 32 is press-contacted to the horizontal plate feeder cam 23 through a piston rod 34, of which end portion is connected to the end of the lever 24. Numeral 35 is a cylinder. The other end of the lever 24 is supported by the guide plate 17 through a roller 36. One end of the rod 25 is connected to the free end of the lever 24 through a universal joint, and the other end thereof is connected to the fixing portion of the carrier 2 through another universal joint.

A lifter cam 37 causing the lifting and lowering motions to the carriers 1, 2 is vertically fixed at the main shaft 4 which is conventionally used, as shown in FIGS. 2 and 3. A vertical swinging lever 39 supported by a shaft 40 is swung by a follower 38 pivotted at the lever 39 while the motion of the lever 39 is controlled by the profile of the cam 37 through the follower 38. A long lever 41 is connected to the upper end of the lever 39. The left end of the long lever 41 is pivotted at the upper end of a lever 42, and the base portion of the lever 42 is fixed to a shaft 43. A sector gear 44 is fixed to the shaft 43, and a vertical supoorting pole 45 is provided with rack portion engaging with the sector gear 44 and the upper end of said supporting pole 45 is fixed to a frame 46. The right end of the long lever 41 is pivotted at the end of a lever 47, and the base portion of the lever 47 is fixed to a shaft 48. A sector gear 49 is fixed to the shaft 48, and a vertical supporting pole 50 is provided with a rack portion engaging with the sector gear 49 and the upper end of said supporting pole 50 is fixed to the frame 46. A frame 46 is provided with rails 22, 22 and is supported by the poles 45, 50 and the similar two poles (not shown) thereby to carry out lifting and lowering motions together. By the lifting and lowering motions of the frame 46, carriers 1, 2 are lifted and lowered through rails 22, 22 mounted on the frame 46.

The transfer feeder according to the present invention is constituted as described above, so that it is operated as follows.

The main shaft 4 is rotated by actuating a motor (not shown), by which the transfer feeder is operated so as to synchronize to the operations of the preceding press and the following press. The rotation of the main shaft 4 causes to rotate each of the shafts 7, 27 through couplings 6, 26 and also causes to rotate each of the cam-fixing shafts 10, 30 through bevel gears 8, 9, 28, 29, which in turn rotate each of the horizontal plate feeder cams 11, 23 fixed on said cam-fixing shafts 10, 30, with both of said cam-fixing shafts being made to rotate at the same speed. By the rotation of the horizontal plate feeder cams 11, 23, each of the levers 13, 24 are swung through the followers 14, 33, and then predetermined advancing and returning motions are given respectively to the unloading carrier 1 and the loading carrier 2 by means of rods 19, 25 connected to said levers 13, 24.

The lifting and lowering motions of the carriers 1, 2 are controlled by rotation of a vertical cam 37 fixed on the main shaft 4. That is, the long lever 41 is operated by a lever 39 swinging along the edge of the cam 37; the long lever 41 actuates each of sector gears 44, 49 through levers 42, 47 and shafts 43, 48 respectively mounted at the right and left sides of the long lever 41, and each of vertical supporting poles 45, 50 is lifted and lowered through a rack portion. In this manner, the carriers 1, 2 are lifted or lowered integrally with the rails 22, 22. Since such lifting and lowering motions of the carriers 1, 2 are carried out at the forward end and backward end of each of carriers 1, 2, the motion of each of the carriers 1, 2 shows a rectangular cyclic motion which comprises advancing-lifting-returning-lowering, and also is controlled and synchronized by the profiles of horizontal plate feeder cams 11, 23 and vertical cam 37.

In this way, the fork is advanced into the press room of the preceding press by advance of the carrier 1, then taking out the formed articles, placing said articles on the placing rails 3 by lifting and returning of the carrier 1, then lowering the carrier 1 to operate for the next cycle, taking up said articles on the rails 3 by lifting and returning of the carrier 2 and introducing said articles on the rails 3 into the press room of the following press by means of the fork, and after lowering the carrier 2 and placing said articles on a press die, the fork is withdrawn from the press room by the advancing motion of the carrier 2.

In the apparatus according to the present invention, the cam causing a horizontal stroke to the carrier is made to rotate in a horizontal plane, so that it is possible to increase the stroke of the carrier. That is, it can be attained by increasing the diameter of the horizontal plate cam to increase the distance of transfer feeding of formed articles. Thus, in the transfer feeder of the present invention, function in each part of the apparatus will not be obstructed,, even though the height of the apparatus is restricted, contrary to the case in the conventional apparatus which is provided with a vertical cam for advancing and returning motion of the carriers.

Accordingly, in using the transfer feeder of the present invention, the cam which controls the horizontal stroke is constituted by a horizontally rotating cam, so that no matter how large the transfer stroke may be, the height of the apparatus will not be increased because the increase in stroke can be effected by increasing the diameter of the horizontally rotating cam thus the apparatus can be efficiently operated.

What is claimed is:

1. The transfer feeder characterized in that a main shaft arranged perpendicularly to the transferring direction of a formed article and extending in a horizontal direction is rotated by a driving means, a driving shaft having a first bevel gear is continuously connected to both ends of the main shaft, a cam-fixing shaft is arranged perpendicularly and vertically to an axial line of the main shaft correspondingly to each driving shaft, a second bevel gear is fixed at the lower end of each cam-fixing shaft and engaged with each first bevel gear, a horizontal plate feeder cam is fixed at the upper end of each cam-fixing shaft, a guide plate is arranged between said horizontal plate feeder cams, a lever is provided swingably in the horizontal plane around a supporting shaft which is disposed correspondingly to each horizontal plate feeder cam, the free end of said lever being movable along the guide plate through a follower provided in each lever, an unloading carrier and a loading carrier are provided respectively so as to cause the advancing motion and the returning motion along a rail on the frame, a rod is respectively connected at its one end to the unloading carrier and the loading carrier and at its other end to each lever, a fork is respectively mounted on the unloading carrier and the loading carrier, a lifter cam is vertically fixed on the main shaft, a vertically swinging lever supported by a shaft is swung through a follower pivotted to said vertically swinging lever, a long lever is connected at its center portion in the lengthwise direction to the upper end of said vertically swinging lever, a short lever is connected respectively to both ends of the long lever, the base portion of said short lever is fixed to a mounting shaft, a sector gear is fixed to the mounting shaft, a vertical supporting pole having a rack portion is fixed at its upper end to the frame, said rack portion being engaged with said sector gear, whereby the unloading carrier and the loading carrier cause the rectangular cyclic motion in the vertical direction by rotating the main shaft and at the same time by the fork of the unloading carrier, formed articles are taken out from the preceding press and then by the fork of the loading carrier, said formed articles are transferred into the following press, and thus a large ratio of horizontal stroke is obtained for the height of the apparatus.

2. A transfer feeder assembly comprising loading and unloading carrier means for transferring an article, a first and a second horizontal plate feeder cam operative, respectively, to effect advancing and returning movement of said unloading and said loading carrier means, a pair of cam-fixing shafts each having one of said horizontal plate feeder cams affixed thereto for effecting rotation of said cams in a horizontal plane, means for effecting rotation of said cam-fixing shafts at the same speed, a guide plate arranged between said first and second horizontal plate feeder cams, rod and lever means operatively interposed between said cams and said carrier means, said guide means being operative to secure advancing and returning motions of both said carrier means through said rod and lever means by rotation of said horizontal plate feeder cams, and a lifting cam mounted upon a horizontal shaft for rotative movement in a vertical plane, said lifting cam being operatively connected to effect lifting and lowering motions of said carrier means, whereby said carrier means may be moved respectively with a rectangular cyclic motion having a large ratio of horizontal stroke relative to the height of the assembly.

* * * * *